(12) United States Patent
Karanth et al.

(10) Patent No.: US 12,688,205 B2
(45) Date of Patent: Jul. 21, 2026

(54) CONTEXT DEPENDENT TRANSACTION PROCESSING ENGINE

(71) Applicant: Salesforce, Inc., San Francisco, CA (US)

(72) Inventors: Rakesh Ganapathi Karanth, San Francisco, CA (US); Parth Vaishnav, San Francisco, CA (US); Chris Robison, San Francisco, CA (US); Russ Halvorson, San Francisco, CA (US)

(73) Assignee: Salesforce, Inc., San Francisco, CA (US)

( * ) Notice: Subject to any disclaimer, the term of this patent is extended or adjusted under 35 U.S.C. 154(b) by 616 days.

(21) Appl. No.: 17/819,502

(22) Filed: Aug. 12, 2022

(65) Prior Publication Data

US 2024/0054149 A1 Feb. 15, 2024

(51) Int. Cl.
*G06F 9/46* (2006.01)
*G06F 16/2452* (2019.01)
*G06F 16/27* (2019.01)
*G06F 16/28* (2019.01)

(52) U.S. Cl.
CPC ............ *G06F 16/284* (2019.01); *G06F 9/466* (2013.01); *G06F 16/24526* (2019.01); *G06F 16/273* (2019.01)

(58) Field of Classification Search
CPC ...................... G06F 16/24526; G06F 9/466
See application file for complete search history.

(56) References Cited

U.S. PATENT DOCUMENTS

| | | | |
|---|---|---|---|
| 6,856,993 B1* | 2/2005 | Verma ................. | G06F 16/1865 |
| 8,135,633 B1* | 3/2012 | LeBaron ............... | G06Q 40/12 |
| | | | 705/30 |
| 9,070,136 B2* | 6/2015 | Benson ............. | G06Q 30/0201 |
| 10,152,497 B2 | 12/2018 | Doan | |
| 10,235,476 B2 | 3/2019 | Vaishnav | |
| 10,387,388 B2 | 8/2019 | Doan | |
| 10,901,996 B2 | 1/2021 | Doan | |
| 11,138,222 B2 | 10/2021 | Semlani | |
| 11,204,961 B1* | 12/2021 | Farber ..................... | H04L 67/61 |
| 11,354,285 B2 | 6/2022 | Ker | |
| 2011/0167245 A1* | 7/2011 | Lavrov ................. | G06F 9/4881 |
| | | | 712/E9.016 |
| 2012/0310987 A1* | 12/2012 | Dragojevic ............. | G06F 9/467 |
| | | | 707/792 |
| 2014/0195740 A1* | 7/2014 | Saund ..................... | G06F 9/466 |
| | | | 711/141 |
| 2016/0110354 A1 | 4/2016 | Jagota | |
| 2017/0286441 A1 | 10/2017 | Doan | |

(Continued)

*Primary Examiner* — Apu M Mofiz
*Assistant Examiner* — Dara J Glasser
(74) *Attorney, Agent, or Firm* — Kwan & Olynick LLP

(57) ABSTRACT

A contextual processing engine architecture. The architecture utilizes data objects retrieved from a database to form a new transactional item data structure as input into a contextual processing engine. The transactional data structure includes a prior context pointer to point to historical context. The historical context can be null for new transactions or one or more basis transaction item data structures for contextual transactions. The processing engine processes the input using process functions lists and aggregates the results for output.

19 Claims, 8 Drawing Sheets

(56) References Cited

U.S. PATENT DOCUMENTS

| 2017/0293629 | A1 | 10/2017 | Doan | |
| 2018/0096003 | A1 | 4/2018 | Vaishnav | |
| 2018/0129686 | A1 | 5/2018 | Vaishnav | |
| 2018/0183671 | A1 | 6/2018 | Dvinov | |
| 2018/0189792 | A1 | 7/2018 | Vaishnav | |
| 2018/0321935 | A1* | 11/2018 | Bansal | G06F 3/04842 |
| 2019/0236460 | A1 | 8/2019 | Jagota | |
| 2020/0250189 | A1 | 8/2020 | Dvinov | |
| 2021/0182255 | A1 | 6/2021 | Hersans | |
| 2021/0216591 | A1 | 7/2021 | Dvinov | |
| 2021/0234890 | A1 | 7/2021 | Bansal | |
| 2021/0241047 | A1 | 8/2021 | Karanth | |
| 2021/0241179 | A1 | 8/2021 | Karanth | |
| 2021/0241300 | A1 | 8/2021 | Vaishnav | |
| 2021/0241301 | A1 | 8/2021 | Christensen | |
| 2021/0241328 | A1 | 8/2021 | Christensen | |
| 2021/0241329 | A1 | 8/2021 | Christensen | |
| 2021/0241330 | A1 | 8/2021 | Vaishnav | |
| 2021/0263663 | A1 | 8/2021 | Bansal | |
| 2021/0406936 | A1 | 12/2021 | Christensen | |
| 2022/0035864 | A1* | 2/2022 | Morton | G06F 40/284 |

* cited by examiner

CONTEXT DEPENDENT TRANSACTION PROCESSING ENGINE

FIELD OF TECHNOLOGY

This patent document relates generally to computer systems, and more specifically to database system architecture.

BACKGROUND

"Cloud computing" services provide shared resources, applications, and information to computers and other devices upon request. In cloud computing environments, services can be provided by one or more servers accessible over the Internet rather than installing software locally on in-house computer systems. Users can interact with cloud computing services to undertake a wide range of tasks.

Often times, with cloud computing, users interact and communicate with backend servers via a user interface that utilizes functions defined in an Application Programming Interface (API). In many instances, underlying the API is a transaction processing engine that processes orders and transactions between user devices and the backend servers.

There is often a single endpoint to the API, with an abstract layer that operates in the background. Most processing engines focus on new processing transactions. However, there are certain transaction types that require context. Current processing engines lack the ability to create definitions and thus require inferences to process contextual processing transactions. This requirement prevents transactions from being processed at line-item level. Thus, there is a need for an improved processing engine designed to be able to process contextual processing transactions at line-item level.

BRIEF DESCRIPTION OF THE DRAWINGS

The included drawings are for illustrative purposes and serve only to provide examples of possible structures and operations for the disclosed inventive systems, apparatus, methods and computer program products for contextual transaction processing. These drawings in no way limit any changes in form and detail that may be made by one skilled in the art without departing from the spirit and scope of the disclosed implementations.

DETAILED DESCRIPTION

Figure 1:
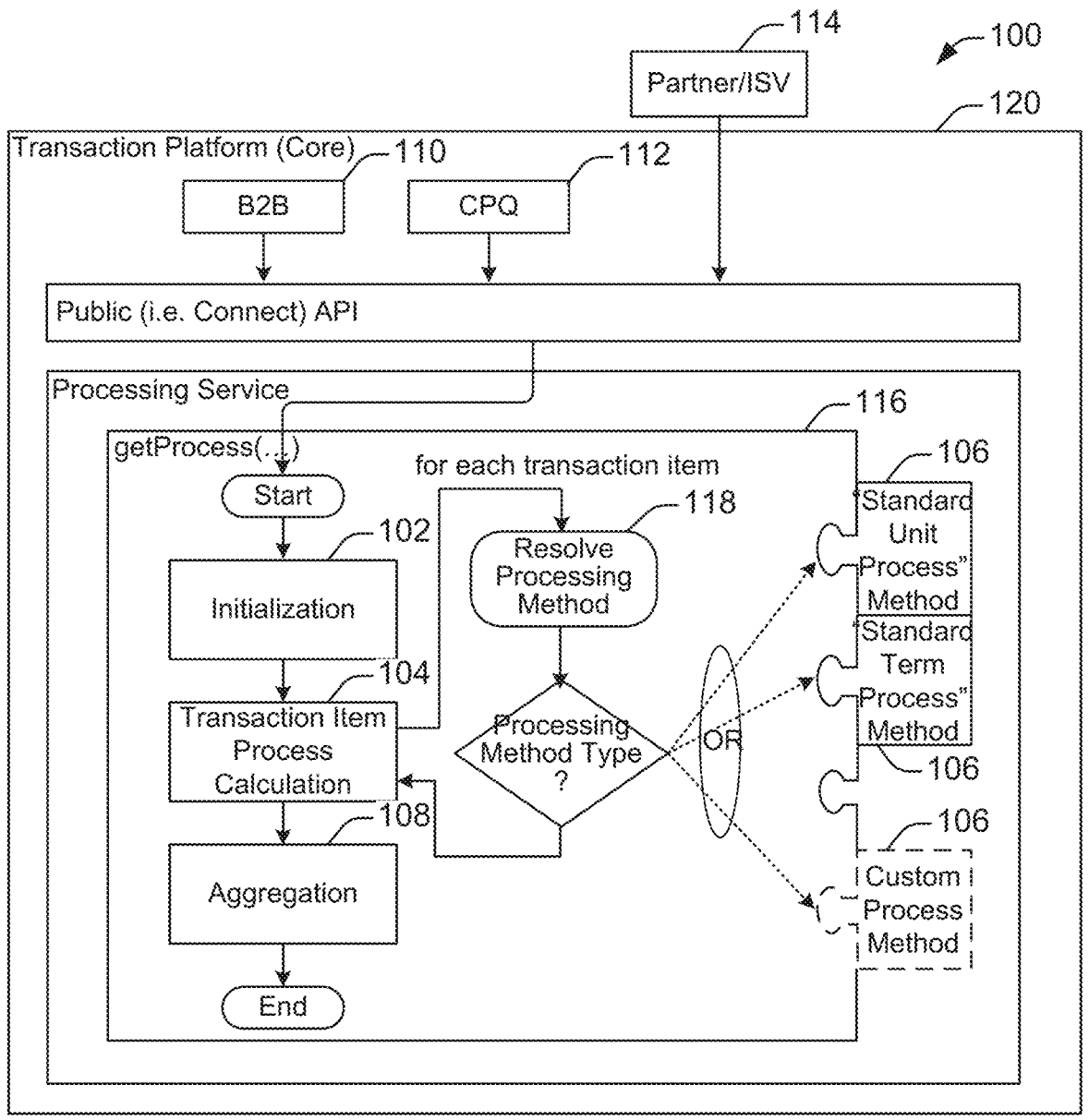
FIG. 1 depicts a top-level view of an example transactional process engine, in accordance with one or more embodiments.

In the following description, numerous specific details are set forth in order to provide a thorough understanding of the present disclosure. The present disclosure may be practiced without some or all of these specific details. In other instances, well known process operations have not been described in detail to not unnecessarily obscure the present disclosure. While the disclosure will be described in conjunction with the specific embodiments, it will be understood that it is not intended to limit the disclosure to the embodiments.

As previously mentioned, current processing engines assume every line item in a transaction is a new processing transaction. However, processing solutions should also be capable of handling other user requests like cancellations, amendments, renewals, etc. Thus, a processing engine architecture and data model should be configured to support contextual processing. As used herein, "context" refers to a user's intent as well as the action that is being performed by the processing engine. In order to understand context, the general architecture of an exemplary process engine will be described in detail.

According to various embodiments, in an exemplary process engine, the primary functions of the process engine include overall processing, processing constructs, default processing, integration, customization, performance consideration, and metadata.

In some embodiments, the processing engine is comprised of three primary (overall) processing stages: pre-processing, item process calculation, and transaction aggregation. The processing algorithms applied by the processing engine are defined using three key processing constructs: the processing method, processing function, and processing flow. Other considerations for designing a process engine include what functionality is supported out of the box, how service developers and admin can customize process flows, how processing achieves certain performance requirements, and what metadata is required to configure and customize the engine. Yet another consideration for the design of a process engine is the design of the data structure and data relationships utilized by the processing engine internally.

Definitions

As used herein, the term "transaction header" refers to a header level data structure used in both the request from a user and response to the user.

As used herein, the term "transaction item" refers to a line item level data structure used in both the request from a user and response to the user.

As used herein, the term "processing method" refers to a specific processing algorithm comprised of a sequence of processing functions. A processing method is applied at the transaction item level. Examples of processing methods include List, Cost Plus, Block, etc.

As used herein, the term "processing function" refers to a highly cohesive logical operation that defines a single step within a processing method.

As used herein, the term "processing flow" refers to the context under which each processing request is made. The processing flow associated with a given processing request may cause each processing method to apply a subset of their processing functions. Examples of processing flows include the following: viewing a product in a product catalog, viewing a product detail page, viewing a product in a configuration page, adding a product to cart, etc.

According to various embodiments, there is a relatively short list of processing flows defined system wide and that list is highly stable. In some embodiments, from an implementation standpoint, a processing flow can be an enum type, only one of which is specified for a given processing request.

Functional Design

According to various embodiments, the processing engine is implemented as a pluggable framework which enables incremental development of both internal processing methods as well as custom processing methods defined by users, e.g., partners/ISVs/customers. The processing engine accepts processing requests from clients, processes each request and provides a response back to the client.

In some embodiments, the processing engine does not update the transaction in the database as a result of process calculations. The caller must provide the transaction (transaction header+transaction items) in the processing request. In some embodiments, the transaction input parameter is immutable by the processing engine. In such embodiments, the processing engine will clone the transaction input parameter to generate the transaction output parameter and apply the results of the processing process to the transaction output parameter.

In some embodiments, the processing engine does read data from the database as required for process calculations. Specifically, the processing engine reads process specific register values, as well as processing function specific data. In some embodiments, the processing engine may write data unrelated to the transaction for the purposes of optimization (i.e. intermediate process calculation state).

According to various embodiments, the processing flow is implemented as a pluggable framework. All processing logic is implemented as a plugin to the processing engine. Each plugin represents a single processing method. Implementors can register their own processing methods with the process engine.

FIG. 1 depicts a top-level view of an example transactional process engine, in accordance with one or more embodiments. Prior to any process calculations, processing engine 100 validates request input parameters via initialization module 102. In some embodiments, Processing engine 100 has the option of pre-loading (cache) and validating any required processing related data.

In some embodiments, an example getProcess ( . . . ) API method 116 implementation comprises three stages, as shown in FIG. 1. The first stage is initialization 102. In some embodiments, the initialization phase of the processing request includes, but is not limited to the following steps: validate and prepare processing request, static analysis of the transaction, and initialize processing functions. In the validate and prepare processing request step, processing engine 100 validates data specific to the request. This data may be associated with a product, process book, process book entry, org, etc.

In some embodiments, static analysis of the transaction is performed to generate the processing plan, which optimizes processing of the transaction items (i.e. batches where possible, manages dependencies between transaction items, etc.). In some embodiments, each processing function's initialize ( . . . ) method is called. The initialize method is called prior to processing the first transaction item and passed a list of the transaction items to which this processing function applies. Each processing function can use this call to load (pre-fetch and cache) any data necessary for subsequent processing of the transaction items.

In some embodiments, each transaction item is processed, via transaction item process calculation module 104, by determining the appropriate processing method. In some embodiments, a context for calculating the transaction item process is prepared and the appropriate processing (or process) method 106 (plugin) is invoked and passed the transaction item context. In some embodiments, all process methods are implemented as plugins to processing engine 100. In some embodiments, each processing method 106 comprises an ordered list of processing functions. In such embodiments, a processing function is a highly cohesive logical processing operation that defines a single step within a processing method.

In some embodiments, the transaction item process calculation method comprises the following steps: transaction item level calculation, and derived processing calculation. In the transaction item level calculation, processing engine 100 loops through the transaction items and processes each transaction item independently. From the transaction item request, processing engine 100 should be able to identify and instantiate each processing method, and process the transaction item by applying a processing method. The processing methods 106 and their order must be retrieved by a "resolve processing method" 118. Examples of processing methods 106 are "Standard Unit Process" method, "Standard Term Process" method, and Custom Process method. In some embodiments, the derived processing calculation step is where cross transaction item process calculation logic is invoked.

According to various embodiments, after all of the transaction items have been processed by transaction item process calculation module 104, aggregation module 108 performs any aggregate processing required or desired. For example, summarizing total items processed at the header level is a form of aggregate processing.

In some embodiments, the aggregate method aggregates transaction item totals into the header and comprises the following steps: aggregation and post processing. In the aggregation step, aggregation module 108 sums all transaction items into a header level result (overall total transactions process). Next, in the post processing step, post processing logic can be used to handle calculations that must happen after all line item totals have been calculated. For example, applying a header level process adjustment should a execute a transaction for items A and B together. In some embodiments, an end user can inject their own post-processing logic by implementing a provided interface.

In some embodiments, one of the key benefits of using a pluggable architecture for the process engine is that the engine itself knows nothing about the process methods, flows and functions that define the various processing algorithms. This means that users of the processing engine can define their own processing methods, flows and functions to suit their specific needs. However, in some embodiments, processing engine 100 will ship a small set of common processing methods and functions that are likely to be used by clients, such as B2B Commerce 110 and CPQ business applications 112. For example, processing methods that are specific to CPQ business applications 112 can then be developed by a CPQ team and tailored to, and optimized for, CPQ use cases. The same is true for processing methods specific to B2B Commerce 110. Thus, the pluggable architecture allows processing engine 100 to operate as a common services platform, which allows clients to develop highly specific and/or highly optimized processing algorithms. This is an improvement over other processing engines because it solves the problem of processing engines not being able to provide highly specific processing algorithms tailored to specific clients.

According to various embodiments, each processing method 106 defines a specific algorithm for processing a given transaction. In some embodiments, each transaction item within a transaction is associated with exactly one processing method. Each processing method is defined as metadata which specifies the set of processing functions required, the execution order of those processing functions, and the set of processing flows to which each processing function applies. Processing functions and flows are further defined below.

As depicted in the diagram above, the "Standard Unit Process" method 106 is comprised of an ordered sequence of logical steps that together, complete the process calculation for a given transaction item. Each logical step within a processing method is referred to as a "processing function." Processing functions are further defined below.

In some embodiments, a processing method itself is not defined by a class (Java or Apex), but rather is defined as metadata that declares the (globally unique) name of the processing method, a set of specific set of processing functions, the execution order of those processing functions, and whether or not each function is applicable within the context of the specified processing flow. In some embodiments, processing methods may be defined internally, by customers, or partners or ISVs 114.

As metadata, processing methods could be defined as a set of setup base platform objects (BPOs), which are tables in a database, defined by transaction platform 120 and graphically represented in a UI, or defined via any other form of metadata provided by transaction platform 120. In some embodiments, processing engine 100 initially hard-codes a single "Standard Unit Process" processing method in Java code. Once the final decision is made on the best way to represent the process method metadata this hard-coded definition will be replaced.

According to various embodiments, a getProcess request contains two sections: a transaction header and a transaction line item. In some embodiments, a transaction header includes information pertaining to the overall request, e.g., the effective date of the request. In some embodiments, a transaction line item is a list of line items associated with the transaction. Each transaction line item represents a transaction or product, and includes information for the individual transaction that needs to be processed. Examples of processing methods provided out of the box include Standard Unit, Derived (i.e. Percent of Total), Cost, Term, Term Usage and Block.

According to various embodiments, the calculations associated with a processing method can be visualized using a graphical construct known as a "process waterfall." Each processing method adjusts the process of a transaction in accordance with a single process waterfall.

In some embodiments, the process of a given transaction may be represented graphically on the 'y' axis and the various adjustments to the process may be represented on the 'x' axis. Process adjustments may be applied to a previous step in the process waterfall. In addition, process points typically define the boundary between processing functions that comprise the processing method that results in this process waterfall.

According to various embodiments, a processing function is a highly cohesive unit of processing calculations that performs a single functional step within one or more processing methods. In some embodiments, the default processing functions provided out of the box are written in Java. In some embodiments, the processing functions that make up a given processing method are executed in sequence within the context of a transaction item and processing flow.

In some embodiments, processing functions are ordered with regard to execution within a given processing method. In some embodiments, each processing function may contribute zero or more intermediate process calculations. In some embodiments, each processing function has a final process point that represents the final calculation for that processing function.

According to various embodiments, unlike process methods, process functions are defined in code, written in either Java or Apex. In some embodiments, custom process functions are written in Apex.

In one custom process method example, a user (customer/partner/ISV) has made a copy of (cloned) the "Standard Unit Process" method provided for the purpose of replacing the default. To implement the custom function which retrieves the transaction process from the customer's ERP, a custom implementation is written by defining a custom Apex class. The Apex class must implement the process function in the Apex interface provided as part of the process engine implementation. The custom "Unit Process" method's metadata specifies a reference to the Apex implementation instead of the default provided Java implementation. The user then associates this new custom "Unit Process" method with one or more transactions. At runtime, when the processing engine is performing a process calculation on a transaction item associated with a product for which the processing method resolves to the custom "Unit Process" method, the custom "Get Process" function is called, invoking the custom Apex implementation. The callout is made to the user's ERP, and the starting process for the transaction will be set accordingly. The remaining provided processing functions are then executed as usual to complete the process calculation for the current transaction item.

According to various embodiments, the author of a custom processing function may need access to the value of a custom field defined on the transaction and/or transaction item. The transaction input parameter to the getProcess ( . . . ) API includes a Map<String, DescribedFieldValue>customFields; attribute that provides access to the value of custom fields defined on either the transaction or transaction item. The map key in the customFields attribute contains the fully qualified API name of each custom field. The DescribedFieldValue is a type safe encapsulation of describe (meta) data on the field and the value of the custom field at the time the process request was made.

According to various embodiments, in addition to adding new processing methods, functions and flows, the processing engine exposes a pre-defined set of extension points. Each extension point allows customization of the basic flow of the processing engine itself. A customization to the processing engine is referred to as a "Processing Engine Extension." The processing engine defines a set of "extension points" within the main processing flow, and provides both a Java and an Apex interface, which each processing engine extension must implement. Each processing engine extension is then associated with a specific extension point in the process processing flow. In some embodiments, extension points can be inserted in between each step (e.g., every arrow in FIG. 1) in getProcess ( . . . ) method 116. In other words, extension points can be inserted pre-initialization, post-initialization, for each transaction item, pre-transaction item processing, post-transaction item processing, pre-aggregation, and post-aggregation. In some embodiments, at any of the available extension points, a customer/partner/ISV can add custom extensions by associating an Apex class, invocable action or flow that defines the custom extension with the extension point name.

In some embodiments, the processing engine allows more than one processing engine extension to be applied at a given extension point. In some embodiments, each implementation of the ExtensionPoint interface will specify a relative numeric ordering value for extensions applied to a single extension point. If more than one extension associated with a given extension point specifies the same execution order value, all extensions will be executed, however the execution order of those extensions may be undefined.

In some embodiments, each extension can determine whether subsequent extensions associated with the current extension point should be executed. Each extension may also determine the next extension point (by name) in the basic processing engine flow to execute. In some embodiments, by specifying that no additional extensions for the current extension point be executed, any extension can short circuit the flow of extensions associated with a given extension point. By specifying the next extension point to be executed, any extension point can bypass basic processing engine logic. For example, if an extension associated with the post-initialization specifies the next extension point to be executed as pre-aggregation, that extension has in effect bypassed the default processing of the transaction items. A use case for this feature would be a customer that wishes to leverage the validation logic in the initialization stage and apply the standard aggregation functions, but process each transaction item externally. In some embodiments, if more than one extension associated with a given extension point modifies the next extension point to be executed, the last extension to execute determines the next step in the process.

According to various embodiments, in order to ensure timely process calculations, strict guardrails may be applied to extensions written in Apex. These guardrails ensure that the processing engine runs smoothly and efficiently, despite the existence the extension points. Examples of guardrails include: execution time (i.e. wall clock time), CPU time, heap space consumed, the ability to read/write to the database, and the ability to make external callouts. In some embodiments, in the event that any of the applied guardrails are violated during execution of one or more extensions at a given extension point, the error condition will be logged, noted in the audit trail and bubbled back through the API as an execution exception.

According to various embodiments, in order to process transactions with more than a trivial number (<106) transaction items in a reasonable amount of time, the processing engine will support incremental process calculations. The implication being that the processing engine will support delta process calculations. This means that only those changes which have been made to the transaction since the last process calculation for that transaction need to be provided to the processing engine API. In order to support incremental process calculations, the processing engine will need to "remember" (i.e. memoize, cache, store, etc.) intermediate process calculations.

For example, if a user that is editing a reasonably large (i.e. 100 transaction items) quote changes the quantity of transaction item #27, the processing engine should only need to recalculate transaction item #27 and any other transaction items that depend on transaction item #27 (i.e. a Percent of Total line item in the quote) and then aggregate and update the transaction totals.

In some embodiments, in order for the client (caller) to make use of incremental process calculations, the process engine must return a transaction identifier in the processing results. The user must then pass that transaction identifier back into the process engine for all future processing requests.

In some embodiments, in order to optimize processing of transactions, the process of processing transaction items within a transaction will be driven by the output of a processing plan optimizer. The output of the processing plan optimizer which drives the processing of transaction items is known as a processing plan. The purpose of the processing plan is to specify the order of calculation for the transaction items associated with the transaction.

In some embodiments, in order to construct an optimal processing plan for a given transaction, the processing plan optimizer must analyze the transaction and its associated transaction items. During the analysis phase of constructing the processing plan, the following information will be gathered from the transaction: identify the processing method for each transaction item, identify dependencies between transaction items, identify all products associated with all transaction items, along with counts of those products.

In some embodiments, some information required for processing plan optimization can be gathered through a static analysis of the transaction. Other important pieces of information, for example, transaction item dependencies, can only be determined as a result of performing the processing calculation on a given transaction item. For example, if during the calculation of a given transaction item a reference is made, either via an associated processing function or an extension, to another transaction item, a transaction item dependency has been identified. When such transaction item dependencies are identified, the processing plan must be updated to capture those dependencies and the processing plan may change as a result.

In some embodiments, once the processing plan for a given transaction is complete, the processing engine begins applying process calculations to transaction items according to the processing plan. During execution of the processing plan, a process calculation for a given transaction item may involve a lookup to another transaction item. The processing engine will recognize the lookup and submit a new transaction item dependency to the processing plan optimizer which updates the processing plan to reflect this newly discovered dependency.

In some embodiments, a processing engine assumes every line item in a transaction is a new transaction. However, a more complete processing engine should be capable of handling more complex transaction requests, or contextual transactions, like Cancellations, Amendments, Renewals, etc. Thus, according to various embodiments, processing engine 100 is configured to be able to handle new transactions and contextual transactions.

Figure 2:
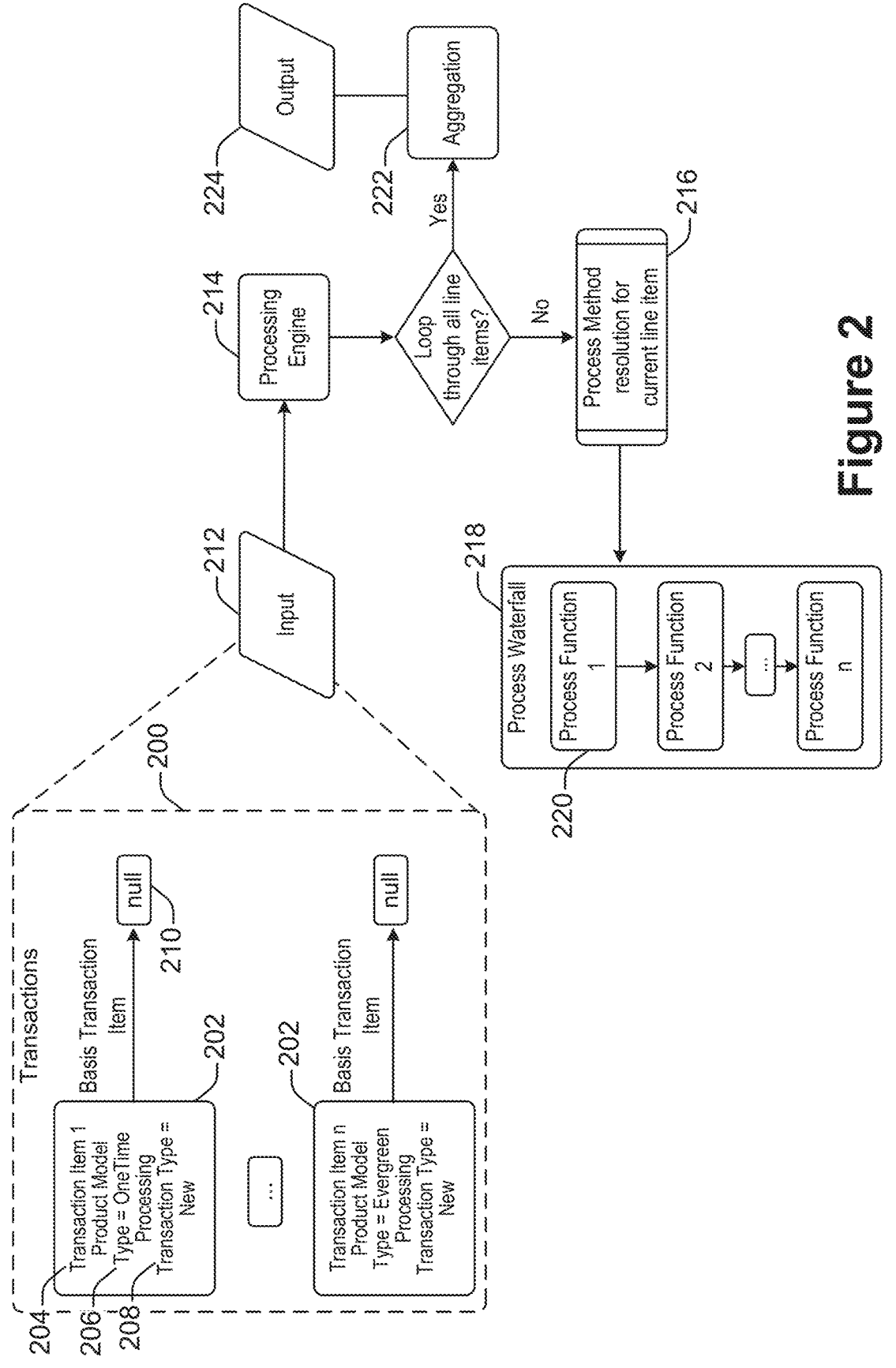
FIG. 2 is a block diagram showing how example transactions without context are processed by a processing engine, in accordance with one or more embodiments.

As previously mentioned, "context" refers to the user intent as well as the action that is being performed by the processing engine. In order to accomplish contextual processing, the processing engine is configured to digest a new modified data structure that includes two additional fields for contextual processing. FIG. 2 is a block diagram showing how transactions 200 are processed by processing engine 214, in accordance with one or more embodiments. Transactions 200 comprises one or more transaction items 202. Each transaction item 202 is implemented as a data structure with a transaction item number field 204, a product model type field 206, and a processing transaction type field 208. Transaction item number field 204 contains an identifier for the particular transaction. Product model type field 206 defines product model type, such as "one time" transactions or "evergreen" transactions. Processing transaction type field 208 defines the type of transaction, such as a new transaction or a contextual transaction. Although transactions 200 include new transaction items, the data structure for each of the transaction items is set up to be able to handle contextual transactions. Therefore, transaction data structure 202 also contains a basis transaction item pointer to a basis transaction item. However, since transactions 200 do not require context, the pointer points to a null item 210.

In some embodiments, processing transaction type field 208 is an ENUM field that can be used by customers to set the processing context per line item. According to various embodiments, the architecture supports a variety of processing transaction types, including, but not limited to, New Transaction, Cancellation, Renewal, Modified Renewal, Quantity Increase Amendment, and Quantity Decrease Amendment. In some embodiments, other than New Transaction, the remaining transaction types require prior context. In some embodiments, prior context is implemented as a pointer to an already processed line item, which is represented as a basis transaction item data structure. This basis transaction item data structure contains information that can be extracted to process the current transaction item. For example, when performing a Cancellation processing engine 214 must ensure the transaction being canceled matches up with the transaction previously processed using a new transaction type.

According to various embodiments, a plurality of transaction items 202 make up transactions 200, which are then packaged as input 212 into processing engine 214. Since new transaction is a transaction type that does not require any prior context, all the information that is required for processing comes from the current line item. Processing engine 214 then processes input 212 one line item at a time until all line items have been looped through. For each current line item, the process method resolution 216 is determined using process waterfall 218. Process method resolution 216 works by using processing transaction type 208 and the product model type 206 to derive the appropriate process waterfall 218. As described above with reference to FIG. 1, process waterfall 218 comprises an ordered list of processing functions 220 that are applicable for the current line item that is about to be processed by processing engine 214. In some embodiments, this ordered list of process functions 220 helps compute all the fields necessary for processing a particular line item transaction. After processing engine 214 has looped through all line items, the results are aggregated by aggregation module 222 and then subsequently presented as output 224.

Figure 3:
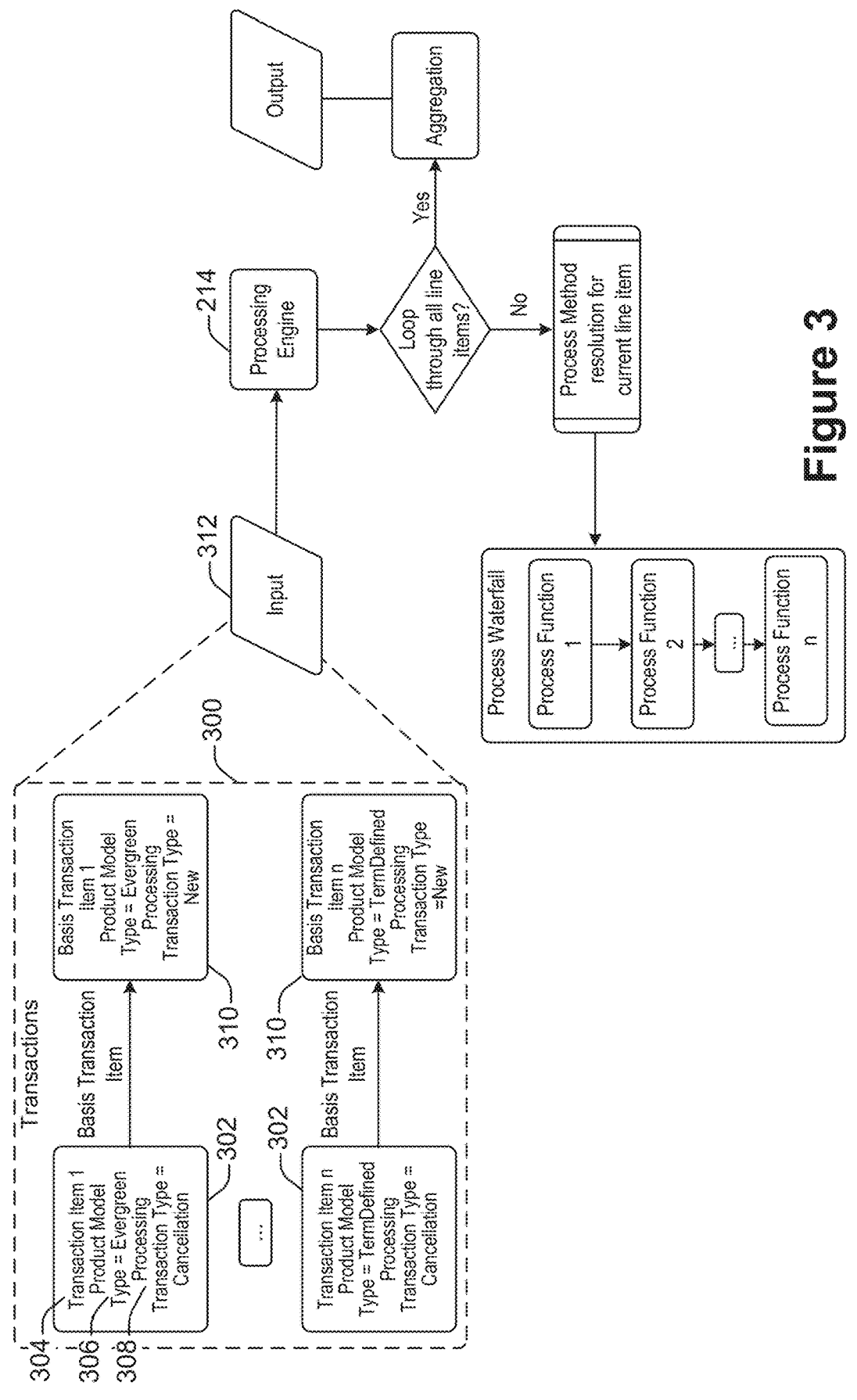
FIGS. 3 and 4 are block diagrams showing how example contextual transactions are processed by a processing engine, in accordance with one or more embodiments.
Figure 4:
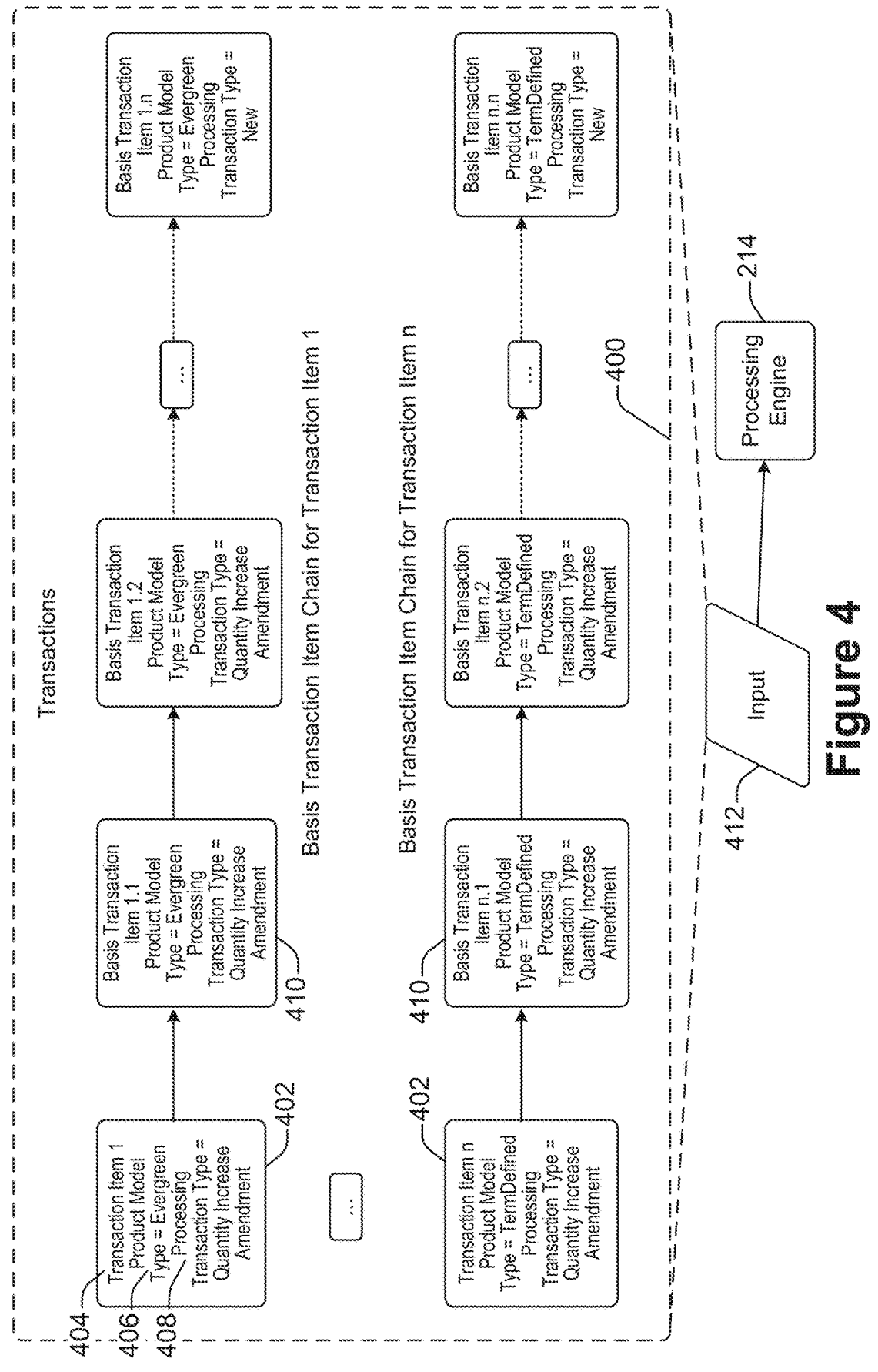

FIG. 2 shows how example transactions, with no requirement for context, are processed. FIGS. 3 and 4 are block diagrams showing how example contextual transactions are processed by a processing engine, in accordance with one or more embodiments. FIG. 3 shows example transactions including cancellation transaction items being processed by the processing engine. FIG. 4 shows example transactions including quantity increase amendment transaction items being processed by the processing engine.

As shown in FIG. 3, transactions 300 comprise one or more transaction items 302. Similar to transaction item 202 in FIG. 2, each transaction item 302 is implemented as a data structure with a transaction item number field 304, a product model type field 306, and a processing transaction type field 308. As with field 204, transaction item number field 304 contains an identifier for the particular transaction. As with field 206, product model type field 306 defines product model type, such as "one time" transactions or "evergreen" transactions. Processing transaction type field 308 in this case defines the contextual transaction type of "cancellation." Since transactions 300 include contextual transaction items, the basis transaction item pointer actually points to a basis transaction item 310, instead of a null item as shown in FIG. 2. Basis transaction item 310 is a data structure that was previously processed, and from which processing engine 314 can derive relevant historical context and information. For the case of transactions 300, the basis transaction item 310 fields have to match the corresponding fields of transaction item 302, except for the processing transaction type, which in the case of cancellation, has the value of new transaction. As with transactions 200, transactions 300, comprising a plurality of transaction items, are packaged into input 312 and fed into processing engine 214. The remainder of FIG. 3 is identical to the analogous components presented in FIG. 2 and therefore, does not warrant further description.

Although FIG. 3 illustrates a simple contextual transaction, FIG. 4 illustrates a more complex contextual transaction. FIG. 4 illustrates the processing of transactions 400, which include quantity increase amendment transaction items. As with transactions 200 and transactions 300, transactions 400 include transaction items 402. Fields 404, 406, and 408 are analogous to fields 304, 306, and 308. In addition, processing transaction type 408 is also a contextual transaction type, in this case, quantity increase amendment. In addition, transactions 400 also include basis transaction items 410, similar to basis transaction items 310. However, because transactions 400 include complex contextual transactions, the basis transaction items 410 for each line item can be implemented as a linked List with a "next" pointer to construct a chain of prior line items that provide relevant historical context. This provides improvements to current processing engine architecture because the linked list implementation of basis transaction items allows for single line item access to multiple transactions requiring contextual transactions. This advantage reduces RAM usage during process time, as well as the amount of instructions needed to process line item transactions. As with transactions 300, transactions 400 are then packaged as input 412 and passed to processing engine 214. It is worth noting that the subsequent processes after input 412 is passed to processing engine 214 is the same as in FIGS. 2 and 3, which includes processing engine 214 going through all the prior line items to construct an aggregated quantity count.

Although transactions 200 include only new transaction items, transactions 300 include only cancellation transaction items, and transactions 400 include only quantity increase amendment transaction items, transactions can include any mix-and-match combination of transaction items. For example, in some embodiments, a batch of transactions packaged as input can include new transaction items, cancellation transaction items, and quantity increase amendment transaction items in the same batch of transactions.

In some embodiments, the addition of the basis transaction point also allows for an improved graphical user interface. A graphical user interface that does not allow contextual processing does not allow users to assess assets in the absence of access lifecycle management software. However, with the addition of the basis transaction pointer to the underlying architecture, users can now define the relevant context for transactions processing as well as determine current assets with a single query. Current graphical user interfaces do not allow for this capability. In addition, other processing architectures that derive context, do so by looking at the input payload. This often results in backend assumptions and decision making, which leads to increased processing time and potential errors. By explicitly allowing the users to set the context per line item, the improved graphical user interface increases processing efficiency. Further, the improved architecture also allows a graphical user interface feature of users generating their own reports using the transaction type ENUM field to understand the number of contextual transactions processed in a given time period. Even more, the improved graphical user interface can visually present a customized process waterfall based on the processing transaction type and the product model type, which allows the processing engine to apply only the required processing functions for a given line item transaction, instead of applying all applicable processing functions. This results in faster turnaround times. Yet another advantage is that current processing architectures allow context processing at the transaction level, while the improved architecture described herein allows users to set the context at a per line-item level in the graphical user interface. This allows the users to process any combination of line items in the same transaction. Current graphical user interfaces do not allow for this level of granularity. By contrast, the techniques and mechanisms disclosed herein implement fine-grained control, via an improved graphical user interface, over how user view and handle assets. For example, users can employ "First-In-Last-Out," "Last-In-First-Out," or "Random-Order" Amendments simply by attaching the basis transaction item of their choice to the current line item transaction.

Figure 5:
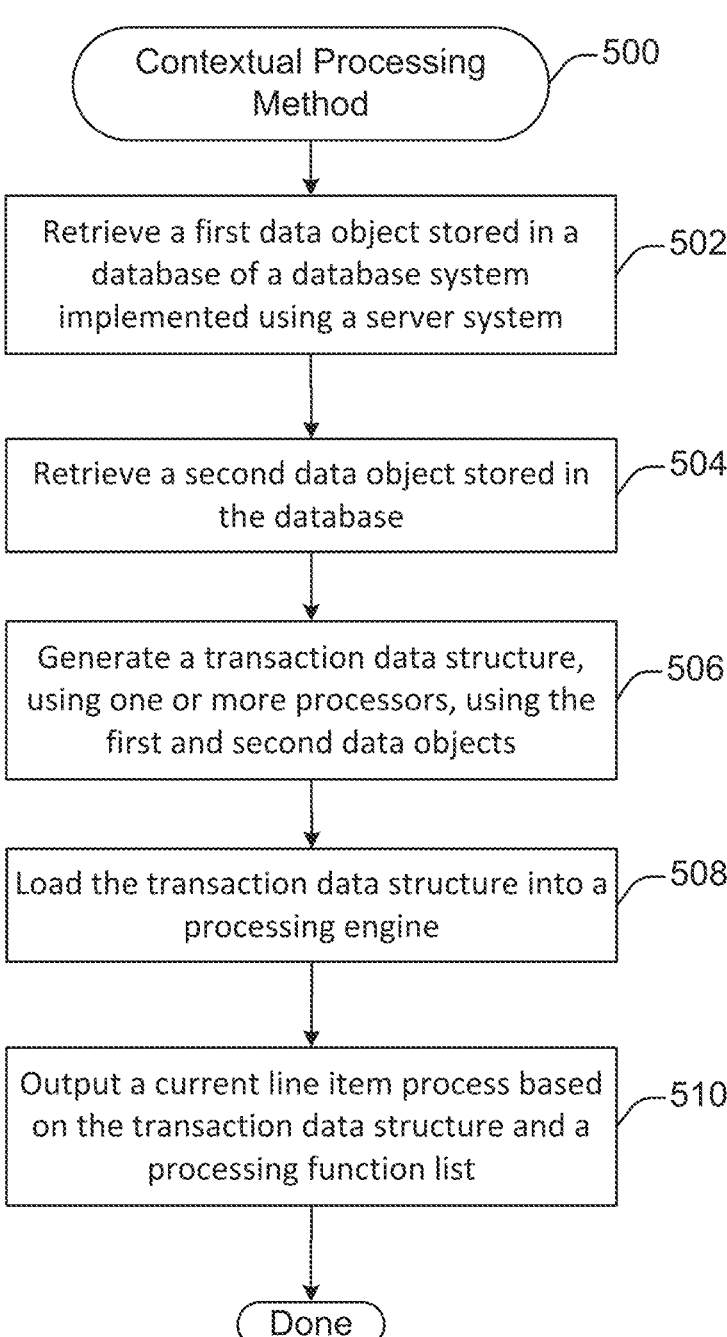
FIG. 5 illustrates an example of a method for contextual processing of transactions, performed in accordance with one or more embodiments.

While the improved process engine architecture has been described above in detail, a method for processing contextual transactions is provided below. FIG. 5 illustrates an example of a method for contextual processing of transactions, performed in accordance with one or more embodiments. Method 500 begins with retrieving (502) a first data object stored in a database of a database system implemented using a server system. In some embodiments, the first data object corresponds to a product model type field. In some embodiments, the product model type field have the value of one time, or evergreen.

At 504, a second data object stored in the database is retrieved. In some embodiments, the second data object corresponds to a processing transaction type field. In some embodiments, the processing transaction type field is an ENUM field that can have a value of new transaction, cancellation, renewal, modified renewal, quantity increase amendment, and quantity decrease amendment.

At 506, a transaction data structure is generated, using one or more processors, using the first and second data objects. In some embodiments, the transaction data structure includes a prior context pointer. In some embodiments, the prior context pointer is configured to point to one or more basis transaction items based on the second data object. In some embodiments, the basis transaction item is determined by the processing transaction type field. In some embodiments, if the process transaction type field value is new transaction, then the prior context pointer points to a null item. In some embodiments, if the process transaction type field value reflects a contextual transaction (anything other than new transaction), then the prior context pointer points to a basis transaction item, which is another data structure based on a previously processed transaction item. In some embodiments, the basis transaction item itself is a linked list of basis transaction item data structures, with each basis transaction item data structure in the list containing a prior context pointer that points to another data structure or null (at the end of the linked list).

At 508, the transaction data structure is loaded into a processing engine. In some embodiments, the processing engine processes multiple line item transactions, with each line item transaction being a separate transaction data structure. In some embodiments, if the input into the processing engine is a plurality of line item transactions, then the processing engine will loop through each line item transaction until all transactions in the plurality of line item transactions have been processed.

Last, at 510, a current line item process based on the transaction data structure and a processing function list is output. In some embodiments, the processing function list is a process waterfall of current line item process functions. In some embodiments, a different process waterfall is designed for each line item transaction. In some embodiments, once all line items have been looped through, then the results are aggregated and then output to the user via a graphical user interface.

In some embodiments, the transaction data structure uses a plurality of identifiers defined via a graphical user interface. In some embodiments, the first and second data objects are formed from information obtained from a user, via the graphical user interface. In some embodiments, the processing engine loads and validates the obtained data objects from the database.

Figure 6:
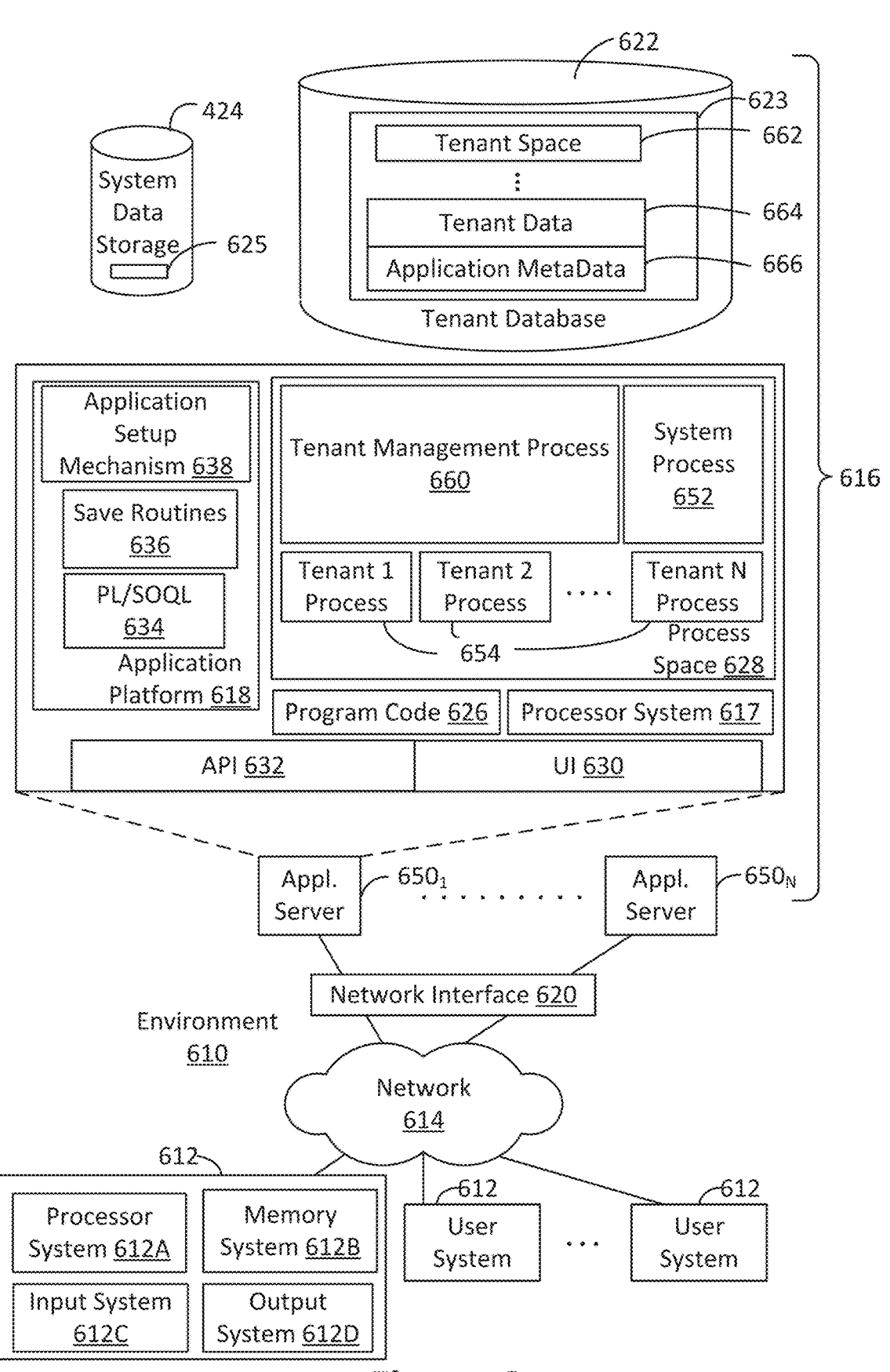
FIG. 6 shows a block diagram of an example of database environment, configured in accordance with one or more embodiments.

FIG. 6 shows a block diagram of an example of an environment 610 that includes an on-demand database service configured in accordance with some implementations.

Environment 610 may include user systems 612, network 614, database system 616, processor system 617, application platform 618, network interface 620, tenant data storage 622, tenant data 623, system data storage 624, system data 625, program code 626, process space 628, User Interface (UI) 630, Application Program Interface (API) 632, PL/SOQL 634, save routines 636, application setup mechanism 638, application servers 650-1 through 650-N, system process space 652, tenant process spaces 654, tenant management process space 660, tenant storage space 662, user storage 664, and application metadata 666. Some of such devices may be implemented using hardware or a combination of hardware and software and may be implemented on the same physical device or on different devices. Thus, terms such as "data processing apparatus," "machine," "server" and "device" as used herein are not limited to a single hardware device, but rather include any hardware and software configured to provide the described functionality.

An on-demand database service, implemented using system 616, may be managed by a database service provider. Some services may store information from one or more tenants into tables of a common database image to form a multi-tenant database system (MTS). As used herein, each MTS could include one or more logically and/or physically connected servers distributed locally or across one or more geographic locations. Databases described herein may be implemented as single databases, distributed databases, collections of distributed databases, or any other suitable database system. A database image may include one or more database objects. A relational database management system (RDBMS) or a similar system may execute storage and retrieval of information against these objects.

In some implementations, the application platform 618 may be a framework that allows the creation, management, and execution of applications in system 616. Such applications may be developed by the database service provider or by users or third-party application developers accessing the service. Application platform 618 includes an application setup mechanism 638 that supports application developers' creation and management of applications, which may be saved as metadata into tenant data storage 622 by save routines 636 for execution by subscribers as one or more tenant process spaces 654 managed by tenant management process 660 for example. Invocations to such applications may be coded using PL/SOQL 634 that provides a programming language style interface extension to API 632. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, issued on Jun. 1, 2010, and hereby incorporated by reference in its entirety and for all purposes. Invocations to applications may be detected by one or more system processes. Such system processes may manage retrieval of application metadata 666 for a subscriber making such an invocation. Such system processes may also manage execution of application metadata 666 as an application in a virtual machine.

In some implementations, each application server 650 may handle requests for any user associated with any organization. A load balancing function (e.g., an F5 Big-IP load balancer) may distribute requests to the application servers 650 based on an algorithm such as least-connections, round robin, observed response time, etc. Each application server 650 may be configured to communicate with tenant data storage 622 and the tenant data 623 therein, and system data storage 624 and the system data 625 therein to serve requests of user systems 612. The tenant data 623 may be divided into individual tenant storage spaces 662, which can be either a physical arrangement and/or a logical arrangement of data. Within each tenant storage space 662, user storage 664 and application metadata 666 may be similarly allocated for each user. For example, a copy of a user's most recently used (MRU) items might be stored to user storage 664. Similarly, a copy of MRU items for an entire tenant organization may be stored to tenant storage space 662. A UI 630 provides a user interface and an API 632 provides an application programming interface to system 616 resident processes to users and/or developers at user systems 612.

System 616 may implement a web-based processing engine system. For example, in some implementations, system 616 may include application servers configured to implement and execute processing engine software applications. The application servers may be configured to provide related data, code, forms, web pages and other information to and from user systems 612. Additionally, the application servers may be configured to store information to, and retrieve information from, a database system. Such information may include related data, objects, and/or Webpage content. With a multi-tenant system, data for multiple tenants may be stored in the same physical database object in tenant data storage 622, however, tenant data may be arranged in the storage medium(s) of tenant data storage 622 so that data of one tenant is kept logically separate from that of other tenants. In such a scheme, one tenant may not access another tenant's data, unless such data is expressly shared.

Several elements in the system shown in FIG. 6 include conventional, well-known elements that are explained only briefly here. For example, user system 612 may include processor system 612A, memory system 612B, input system 612C, and output system 612D. A user system 612 may be implemented as any computing device(s) or other data processing apparatus such as a mobile phone, laptop computer, tablet, desktop computer, or network of computing devices. User system 12 may run an internet browser allowing a user (e.g., a subscriber of an MTS) of user system 612 to access, process and view information, pages and applications available from system 616 over network 614. Network 614 may be any network or combination of networks of devices that communicate with one another, such as any one or any combination of a LAN (local area network), WAN (wide area network), wireless network, or other appropriate configuration.

The users of user systems 612 may differ in their respective capacities, and the capacity of a particular user system 612 to access information may be determined at least in part by "permissions" of the particular user system 612. As discussed herein, permissions generally govern access to computing resources such as data objects, components, and other entities of a computing system, such as a processing engine, a social networking system, and/or a CRM database system. "Permission sets" generally refer to groups of permissions that may be assigned to users of such a computing environment. For instance, the assignments of users and permission sets may be stored in one or more databases of System 616. Thus, users may receive permission to access certain resources. A permission server in an on-demand database service environment can store criteria data regarding the types of users and permission sets to assign to each other. For example, a computing device can provide to the server data indicating an attribute of a user (e.g., geographic location, industry, role, level of experience, etc.) and particular permissions to be assigned to the users fitting the attributes. Permission sets meeting the criteria may be selected and assigned to the users. Moreover, permissions may appear in multiple permission sets. In this way, the users can gain access to the components of a system.

In some an on-demand database service environments, an Application Programming Interface (API) may be configured to expose a collection of permissions and their assignments to users through appropriate network-based services and architectures, for instance, using Simple Object Access Protocol (SOAP) Web Service and Representational State Transfer (REST) APIs.

In some implementations, a permission set may be presented to an administrator as a container of permissions. However, each permission in such a permission set may reside in a separate API object exposed in a shared API that has a child-parent relationship with the same permission set object. This allows a given permission set to scale to millions of permissions for a user while allowing a developer to take advantage of joins across the API objects to query, insert, update, and delete any permission across the millions of possible choices. This makes the API highly scalable, reliable, and efficient for developers to use.

In some implementations, a permission set API constructed using the techniques disclosed herein can provide scalable, reliable, and efficient mechanisms for a developer to create tools that manage a user's permissions across various sets of access controls and across types of users. Administrators who use this tooling can effectively reduce their time managing a user's rights, integrate with external systems, and report on rights for auditing and troubleshooting purposes. By way of example, different users may have different capabilities with regard to accessing and modifying application and database information, depending on a user's security or permission level, also called authorization. In systems with a hierarchical role model, users at one permission level may have access to applications, data, and database information accessible by a lower permission level user, but may not have access to certain applications, database information, and data accessible by a user at a higher permission level.

As discussed above, system 616 may provide on-demand database service to user systems 612 using an MTS arrangement. By way of example, one tenant organization may be a company that employs a sales force where each salesperson uses system 616 to manage their sales process. Thus, a user in such an organization may maintain contact data, leads data, customer follow-up data, performance data, goals and progress data, etc., all applicable to that user's personal sales process (e.g., in tenant data storage 622). In this arrangement, a user may manage his or her sales efforts and cycles from a variety of devices, since relevant data and applications to interact with (e.g., access, view, modify, report, transmit, calculate, etc.) such data may be maintained and accessed by any user system 612 having network access.

When implemented in an MTS arrangement, system 616 may separate and share data between users and at the organization-level in a variety of manners. For example, for certain types of data each user's data might be separate from other users' data regardless of the organization employing such users. Other data may be organization-wide data, which is shared or accessible by several users or potentially all users form a given tenant organization. Thus, some data structures managed by system 616 may be allocated at the tenant level while other data structures might be managed at the user level. Because an MTS might support multiple tenants including possible competitors, the MTS may have security protocols that keep data, applications, and application use separate. In addition to user-specific data and tenant-specific data, system 616 may also maintain system-level data usable by multiple tenants or other data. Such system-level data may include industry reports, news, postings, and the like that are sharable between tenant organizations.

In some implementations, user systems 612 may be client systems communicating with application servers 650 to request and update system-level and tenant-level data from system 616. By way of example, user systems 612 may send one or more queries requesting data of a database maintained in tenant data storage 622 and/or system data storage 624. An application server 650 of system 616 may automatically generate one or more SQL statements (e.g., one or more SQL queries) that are designed to access the requested data. System data storage 624 may generate query plans to access the requested data from the database.

The database systems described herein may be used for a variety of database applications. By way of example, each database can generally be viewed as a collection of objects, such as a set of logical tables, containing data fitted into predefined categories. A "table" is one representation of a data object, and may be used herein to simplify the conceptual description of objects and custom objects according to some implementations. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale process, date, etc. In some multi-tenant database systems, standard entity tables might be provided for use by all tenants. For CRM database applications, such standard entities might include tables for case, account, contact, lead, and opportunity data objects, each containing pre-defined fields. It should be understood that the word "entity" may also be used interchangeably herein with "object" and "table".

In some implementations, tenants may be allowed to create and store custom objects, or they may be allowed to customize standard entities or objects, for example by creating custom fields for standard objects, including custom index fields. Commonly assigned U.S. Pat. No. 7,779,039, titled CUSTOM ENTITIES AND FIELDS IN A MULTI-TENANT DATABASE SYSTEM, by Weissman et al., issued on Aug. 17, 2010, and hereby incorporated by reference in its entirety and for all purposes, teaches systems and methods for creating custom objects as well as customizing standard objects in an MTS. In certain implementations, for example, all custom entity data rows may be stored in a single multi-tenant physical table, which may contain multiple logical tables per organization. It may be transparent to customers that their multiple "tables" are in fact stored in one large table or that their data may be stored in the same table as the data of other customers.

Figures 7A, 7B:
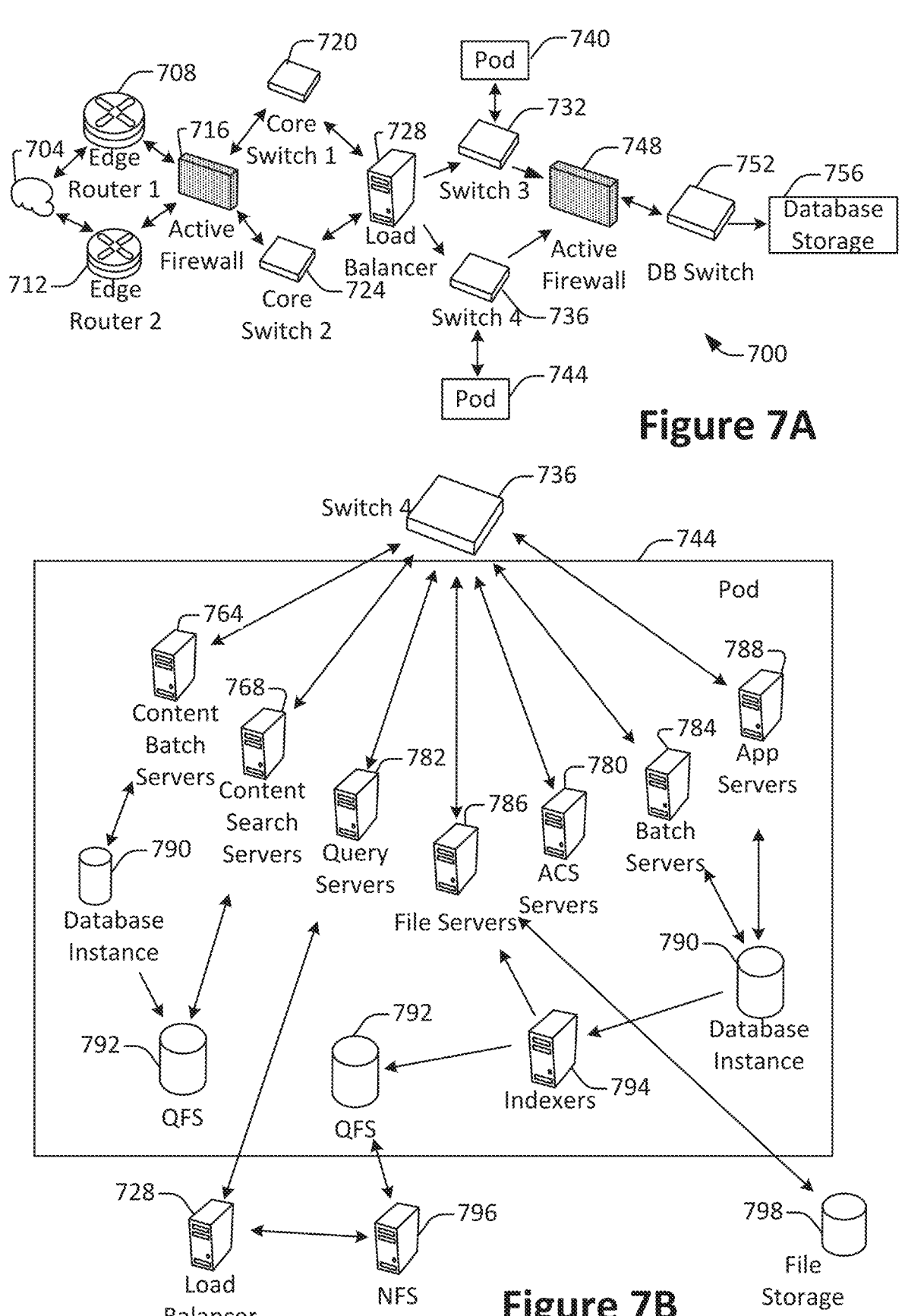
FIG. 7A shows a system diagram of an example of architectural components of an on-demand database service environment, in accordance with embodiments.
FIG. 7B shows a system diagram further illustrating an example of architectural components of an on-demand database service environment, in accordance with one or more embodiments.

FIG. 7A shows a system diagram of an example of architectural components of an on-demand database service environment 700, configured in accordance with some implementations. A client machine located in the cloud 704 may communicate with the on-demand database service environment via one or more edge routers 708 and 712. A client machine may include any of the examples of user systems 612 described above. The edge routers 708 and 712 may communicate with one or more core switches 720 and 724 via firewall 716. The core switches may communicate with a load balancer 728, which may distribute server load over different pods, such as the pods 740 and 744 by communication via pod switches 732 and 736. The pods 740 and 744, which may each include one or more servers and/or other computing resources, may perform data processing and other operations used to provide on-demand services. Components of the environment may communicate with a database storage 756 via a database firewall 748 and a database switch 752.

Accessing an on-demand database service environment may involve communications transmitted among a variety of different components. The environment 700 is a simplified representation of an actual on-demand database service environment. For example, some implementations of an on-demand database service environment may include anywhere from one to many devices of each type. Additionally, an on-demand database service environment need not include each device shown, or may include additional devices not shown, in FIGS. 7A and 7B.

The cloud 704 refers to any suitable data network or combination of data networks, which may include the Internet. Client machines located in the cloud 704 may communicate with the on-demand database service environment 700 to access services provided by the on-demand database service environment 700. By way of example, client machines may access the on-demand database service environment 700 to retrieve, store, edit, and/or process processing engine information.

In some implementations, the edge routers 708 and 712 route packets between the cloud 704 and other components of the on-demand database service environment 700. The edge routers 708 and 712 may employ the Border Gateway Protocol (BGP). The edge routers 708 and 712 may maintain a table of IP networks or 'prefixes', which designate network reachability among autonomous systems on the internet.

In one or more implementations, the firewall 716 may protect the inner components of the environment 700 from internet traffic. The firewall 716 may block, permit, or deny access to the inner components of the on-demand database service environment 700 based upon a set of rules and/or other criteria. The firewall 716 may act as one or more of a packet filter, an application gateway, a stateful filter, a proxy server, or any other type of firewall.

In some implementations, the core switches 720 and 724 may be high-capacity switches that transfer packets within the environment 700. The core switches 720 and 724 may be configured as network bridges that quickly route data between different components within the on-demand database service environment. The use of two or more core switches 720 and 724 may provide redundancy and/or reduced latency.

In some implementations, communication between the pods 740 and 744 may be conducted via the pod switches 732 and 736. The pod switches 732 and 736 may facilitate communication between the pods 740 and 744 and client machines, for example via core switches 720 and 724. Also or alternatively, the pod switches 732 and 736 may facilitate communication between the pods 740 and 744 and the database storage 756. The load balancer 728 may distribute workload between the pods, which may assist in improving the use of resources, increasing throughput, reducing response times, and/or reducing overhead. The load balancer 728 may include multilayer switches to analyze and forward traffic.

In some implementations, access to the database storage 756 may be guarded by a database firewall 748, which may act as a computer application firewall operating at the database application layer of a protocol stack. The database firewall 748 may protect the database storage 756 from application attacks such as structure query language (SQL) injection, database rootkits, and unauthorized information disclosure. The database firewall 748 may include a host using one or more forms of reverse proxy services to proxy traffic before passing it to a gateway router and/or may inspect the contents of database traffic and block certain content or database requests. The database firewall 748 may work on the SQL application level atop the TCP/IP stack, managing applications' connection to the database or SQL management interfaces as well as intercepting and enforcing packets traveling to or from a database network or application interface.

In some implementations, the database storage 756 may be an on-demand database system shared by many different organizations. The on-demand database service may employ a single-tenant approach, a multi-tenant approach, a virtualized approach, or any other type of database approach. Communication with the database storage 756 may be conducted via the database switch 752. The database storage 756 may include various software components for handling database queries. Accordingly, the database switch 752 may direct database queries transmitted by other components of the environment (e.g., the pods 740 and 744) to the correct components within the database storage 756.

FIG. 7B shows a system diagram further illustrating an example of architectural components of an on-demand database service environment, in accordance with some implementations. The pod 744 may be used to render services to user(s) of the on-demand database service environment 700. The pod 744 may include one or more content batch servers 764, content search servers 768, query servers 782, file servers 786, access control system (ACS) servers 780, batch servers 784, and app servers 788. Also, the pod 744 may include database instances 790, quick file systems (QFS) 792, and indexers 794. Some or all communication between the servers in the pod 744 may be transmitted via the switch 736.

In some implementations, the app servers 788 may include a framework dedicated to the execution of procedures (e.g., programs, routines, scripts) for supporting the construction of applications provided by the on-demand database service environment 700 via the pod 744. One or more instances of the app server 788 may be configured to execute all or a portion of the operations of the services described herein.

In some implementations, as discussed above, the pod 744 may include one or more database instances 790. A database instance 790 may be configured as an MTS in which different organizations share access to the same database, using the techniques described above. Database information may be transmitted to the indexer 794, which may provide an index of information available in the database 790 to file servers 786. The QFS 792 or other suitable filesystem may serve as a rapid-access file system for storing and accessing information available within the pod 744. The QFS 792 may support volume management capabilities, allowing many disks to be grouped together into a file system. The QFS 792 may communicate with the database instances 790, content search servers 768 and/or indexers 794 to identify, retrieve, move, and/or update data stored in the network file systems (NFS) 796 and/or other storage systems.

In some implementations, one or more query servers 782 may communicate with the NFS 796 to retrieve and/or update information stored outside of the pod 744. The NFS 796 may allow servers located in the pod 744 to access information over a network in a manner similar to how local storage is accessed. Queries from the query servers 722 may be transmitted to the NFS 796 via the load balancer 728, which may distribute resource requests over various resources available in the on-demand database service environment 700. The NFS 796 may also communicate with the QFS 792 to update the information stored on the NFS 796 and/or to provide information to the QFS 792 for use by servers located within the pod 744.

In some implementations, the content batch servers 764 may handle requests internal to the pod 744. These requests may be long-running and/or not tied to a particular customer, such as requests related to log mining, cleanup work, and maintenance tasks. The content search servers 768 may provide query and indexer functions such as functions allowing users to search through content stored in the on-demand database service environment 700. The file servers 786 may manage requests for information stored in the file storage 798, which may store information such as documents, images, basic large objects (BLOBs), etc. The query servers 782 may be used to retrieve information from one or more file systems. For example, the query system 782 may receive requests for information from the app servers 788 and then transmit information queries to the NFS 796 located outside the pod 744. The ACS servers 780 may control access to data, hardware resources, or software resources called upon to render services provided by the pod 744. The batch servers 784 may process batch jobs, which are used to run tasks at specified times. Thus, the batch servers 784 may transmit instructions to other servers, such as the app servers 788, to trigger the batch jobs.

While some of the disclosed implementations may be described with reference to a system having an application server providing a front end for an on-demand database service capable of supporting multiple tenants, the disclosed implementations are not limited to multi-tenant databases nor deployment on application servers. Some implementations may be practiced using various database architectures such as ORACLE®, DB2® by IBM and the like without departing from the scope of present disclosure.

Figure 8:
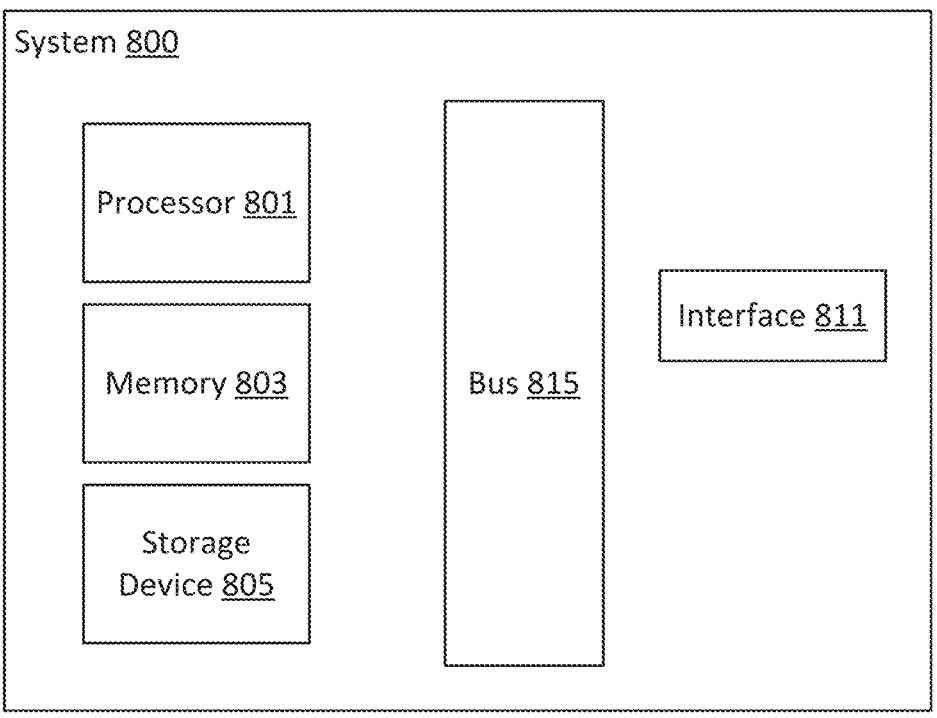
FIG. 8 illustrates one example of a computing device, configured in accordance with one or more embodiments.

FIG. 8 illustrates one example of a computing device. According to various embodiments, a system 800 suitable for implementing embodiments described herein includes a processor 801, a memory module 803, a storage device 805, an interface 811, and a bus 815 (e.g., a PCI bus or other interconnection fabric.) System 800 may operate as variety of devices such as an application server, a database server, or any other device or service described herein. Although a particular configuration is described, a variety of alternative configurations are possible. The processor 801 may perform operations such as those described herein. Instructions for performing such operations may be embodied in the memory 803, on one or more non-transitory computer readable media, or on some other storage device. Various specially configured devices can also be used in place of or in addition to the processor 801. The interface 811 may be configured to send and receive data packets over a network. Examples of supported interfaces include, but are not limited to: Ethernet, fast Ethernet, Gigabit Ethernet, frame relay, cable, digital subscriber line (DSL), token ring, Asynchronous Transfer Mode (ATM), High-Speed Serial Interface (HSSI), and Fiber Distributed Data Interface (FDDI). These interfaces may include ports appropriate for communication with the appropriate media. They may also include an independent processor and/or volatile RAM. A computer system or computing device may include or communicate with a monitor, printer, or other suitable display for providing any of the results mentioned herein to a user.

Any of the disclosed implementations may be embodied in various types of hardware, software, firmware, computer readable media, and combinations thereof. For example, some techniques disclosed herein may be implemented, at least in part, by computer-readable media that include program instructions, state information, etc., for configuring a computing system to perform various services and operations described herein. Examples of program instructions include both machine code, such as produced by a compiler, and higher-level code that may be executed via an interpreter. Instructions may be embodied in any suitable language such as, for example, Apex, Java, Python, C++, C, HTML, any other markup language, JavaScript, ActiveX, VBScript, or Perl. Examples of computer-readable media include, but are not limited to: magnetic media such as hard disks and magnetic tape; optical media such as flash memory, compact disk (CD) or digital versatile disk (DVD); magneto-optical media; and other hardware devices such as read-only memory ("ROM") devices and random-access memory ("RAM") devices. A computer-readable medium may be any combination of such storage devices.

In the foregoing specification, various techniques and mechanisms may have been described in singular form for clarity. However, it should be noted that some embodiments include multiple iterations of a technique or multiple instantiations of a mechanism unless otherwise noted. For example, a system uses a processor in a variety of contexts but can use multiple processors while remaining within the scope of the present disclosure unless otherwise noted. Similarly, various techniques and mechanisms may have been described as including a connection between two entities. However, a connection does not necessarily mean a direct, unimpeded connection, as a variety of other entities (e.g., bridges, controllers, gateways, etc.) may reside between the two entities.

In the foregoing specification, reference was made in detail to specific embodiments including one or more of the best modes contemplated by the inventors. While various implementations have been described herein, it should be understood that they have been presented by way of example only, and not limitation. For example, some techniques and mechanisms are described herein in the context of on-demand computing environments that include MTSs. However, the techniques of disclosed herein apply to a wide variety of computing environments. Particular embodiments may be implemented without some or all of the specific details described herein. In other instances, well known process operations have not been described in detail in order to avoid unnecessarily obscuring the disclosed techniques. Accordingly, the breadth and scope of the present application should not be limited by any of the implementations described herein, but should be defined only in accordance with the claims and their equivalents.

What is claimed is:

1. A method, comprising:

retrieving a first data object stored in a database of a database system implemented using a server system;

retrieving a second data object stored in the database;

generating, using one or more processors, a transaction data structure using the first and second data objects, wherein the transaction data structure includes a prior context pointer, the prior context pointer being configured to point to a linked list of two or more basis transaction items that provide a historical context chain, wherein a next pointer in a first basis transaction item in the linked list points to a second basis transaction item, based on the second data object;

loading the transaction data structure into a processing engine;

outputting a current line item process based on the transaction data structure and a graphical representation of an ordered processing function list applicable for the current line item process, the ordered processing function list being generated based on the transaction data structure and a processing transaction type, the processing engine being configured to use the prior context pointer to apply only required processing functions of the ordered processing function list to the current line item process; and generating a processing plan that specifies an order of calculation for a plurality of transaction items within a transaction; wherein during execution of the processing plan, the processing engine dynamically updates the processing plan upon identifying a new transaction item dependency when a processing function for a first transaction item performs a lookup to a second transaction item.

2. The method of claim 1, wherein the first data object corresponds to a product model type field.

3. The method of claim 1, wherein the first data object corresponds to a processing transaction type field.

4. The method of claim 1, wherein the prior context pointer points to a null item if the second data object contains a new transaction value.

5. The method of claim 1, wherein each basis transaction item comprises a separate data structure or a linked list of data structures corresponding to prior processed transactions.

6. The method of claim 4, wherein a location of the prior context pointer depends on the new transaction value in the second data object.

7. The method of claim 1, wherein the processing engine is configured to process multiple line item transactions and then aggregate results for output.

8. A database system implemented using a server system, the database system configurable to cause:

retrieving a first data object stored in a database of a database system implemented using a server system;

retrieving a second data object stored in the database;

generating, using one or more processors, a transaction data structure using the first and second data objects, wherein the transaction data structure includes a prior context pointer, the prior context pointer being configured to point to a linked list of two or more basis transaction items that provide a historical context chain, wherein a next pointer in a first basis transaction item in the linked list points to a second basis transaction item, based on the second data object;

loading the transaction data structure into a processing engine;

outputting a current line item process based on the transaction data structure and a graphical representation of an ordered processing function list applicable for the current line item process, the ordered processing function list being generated based on the transaction data structure and a processing transaction type, the processing engine being configured to use the prior context pointer to apply only required processing functions of the ordered processing function list to the current line item process; and generating a processing plan that specifies an order of calculation for a plurality of transaction items within a transaction; wherein during execution of the processing plan, the processing engine dynamically updates the processing plan upon identifying a new transaction item dependency when a processing function for a first transaction item performs a lookup to a second transaction item.

9. The database system of claim 8, wherein the first data object corresponds to a product model type field.

10. The database system of claim 8, wherein the first data object corresponds to a processing transaction type field.

11. The database system of claim 8, wherein the prior context pointer points to a null item if the second data object contains a new transaction value.

12. The database system of claim 8, wherein each basis transaction item comprises a separate data structure or a linked list of data structures corresponding to prior processed transactions.

13. The database system of claim 11, wherein a location of prior context pointer depends on the new transaction value in the second data object.

14. The database system of claim 8, wherein the processing engine is configured to process multiple line item transactions and then aggregate results for output.

15. A computer program product comprising computer-readable program code capable of being executed by one or more processors when retrieved from a non-transitory computer-readable medium, the program code comprising instructions configurable to cause:

retrieving a first data object stored in a database of a database system implemented using a server system;

retrieving a second data object stored in the database;

generating, using one or more processors, a transaction data structure using the first and second data objects, wherein the transaction data structure includes a prior context pointer, the prior context pointer being configured to point to a linked list of two or more basis transaction items that provide a historical context chain, wherein a next pointer in a first basis transaction item in the linked list points to a second basis transaction item, based on the second data object;

loading the transaction data structure into a processing engine;

outputting a current line item process based on the transaction data structure and a graphical representation of an ordered processing function list applicable for the current line item process, the ordered processing function list being generated based on the transaction data structure and a processing transaction type, the processing engine being configured to use the prior context pointer to apply only required processing functions of the ordered processing function list to the current line item process; and generating a processing plan that specifies an order of calculation for a plurality of transaction items within a transaction; wherein during execution of the processing plan, the processing engine dynamically updates the processing plan upon identifying a new transaction item dependency when a processing function for a first transaction item performs a lookup to a second transaction item.

16. The method of claim 1, wherein the graphical representation of the ordered processing function list is a process waterfall, and the processing engine is configured to apply each processing function in the process waterfall in a sequential manner to calculate the current line item process.

17. The method of claim 16, wherein the process waterfall includes multiple process points, each process point representing a boundary between two consecutive processing functions in the ordered processing function list, and the processing engine is configured to adjust the current line item process at each process point based on the prior context pointer and the transaction data structure.

18. The method of claim 17, wherein the processing engine is configured to dynamically generate the process waterfall based on the transaction data structure and the processing transaction type, and the process waterfall includes a visualization of the ordered processing function list, allowing a user to view and modify processing functions applied to the current line item process.

19. The method of claim 1, wherein the processing engine is configured to store intermediate process calculations from the ordered processing function list in a cache using a transaction identifier, and wherein the processing engine uses the stored intermediate process calculations to perform an incremental process calculation for a subsequent processing request associated with the same transaction identifier.

* * * * *